E. J. A. SCHULTZ.
PROCESS AND APPARATUS FOR DETERMINING THE POSITION OF AN INACCESSIBLE POINT.
APPLICATION FILED OCT. 22, 1918.

1,428,861.  Patented Sept. 12, 1922.
4 SHEETS—SHEET 1.

Inventor:
Emile Joseph Augustin Schultz,
By Attorneys,
Fraser Turk & Myers

E. J. A. SCHULTZ.
PROCESS AND APPARATUS FOR DETERMINING THE POSITION OF AN INACCESSIBLE POINT.
APPLICATION FILED OCT. 22, 1918.

1,428,861.

Patented Sept. 12, 1922.
4 SHEETS—SHEET 2.

E. J. A. SCHULTZ.
PROCESS AND APPARATUS FOR DETERMINING THE POSITION OF AN INACCESSIBLE POINT.
APPLICATION FILED OCT. 22, 1918.

1,428,861.

Patented Sept. 12, 1922.
4 SHEETS—SHEET 4.

INVENTOR:
Emile Joseph
Augustin Schultz
By Attorneys,
Fraser Turk & Myers.

Patented Sept. 12, 1922.

1,428,861

UNITED STATES PATENT OFFICE.

EMILE JOSEPH AUGUSTIN SCHULTZ, OF PARIS, FRANCE.

PROCESS AND APPARATUS FOR DETERMINING THE POSITION OF AN INACCESSIBLE POINT.

Application filed October 22, 1918. Serial No. 259,241.

*To all whom it may concern:*

Be it known that I, EMILE JOSEPH AUGUSTIN SCHULTZ, a citizen of the Republic of France, and a resident of Paris, France, have invented certain new and useful Improvements in Processes and Apparatus for Determining the Position of an Inaccessible Point, of which the following is a specification.

The invention consists in a process for determining the position of inaccessible points in space, more particularly aerial objects, and the application of the process by means of an electric telemeter which allows the position of the point to be easily determined and its movements to be followed.

The arrangement devised by the applicant rests on the following considerations.

If one assumes an imaginary triangular prism placed horizontally on the ground (or other base) on one of its faces, and two observing stations in contact with the ground at the two extremities of the base of its right section, the intersection of the two oblique faces of the prism determines the geometrical position of points at the same height from the ground.

This property is utilized by means of two stations each comprising a movable plate which is directed by sighting at the point of space of which the position is to be located, an aeroplane for example; the visual planes thus determined intersect on the third edge of the prism defined by the two movable plates and the ground. The height will be determined by the right section of the prism, of which we know the base and the angles subtended at the base; the distance of one station from the aeroplane will be also determined by the right angled triangle defined by this station and the vertical from the aeroplane.

In practice, one of the stations would be situated at the position of the battery; the other, the auxiliary station, at a sufficient distance (one km. for example). The latter only comprises a sighting device operating an electric contact to transmit the variations of the two faces angle which the plane of the movable plate passing through this apparatus and perpendicular to the vertical plane containing the stations makes with the ground.

The principal station comprises in addition to its sighting apparatus two charts; one in the vertical plane of the two stations carrying the receiver controlling, under the action of the currents transmitted from the auxiliary station, an index, the other pivoted vertically on the former carrying a sighting device integral with the index movable plate of the principal station. The two charts constructed to scale give directly the required distances.

The invention will be easily understood by the aid of the accompanying figures and the description, which explain an example of means for carrying out the process and enabling the advantages and the details to be followed.

Fig. 1 is an elevation of the main apparatus and auxiliary apparatus.

Fig. 1ª is a diagrammatic view in space;

Fig. 2 represents the auxiliary station;

Fig. 3 the principal receiving station;

Figure 1:
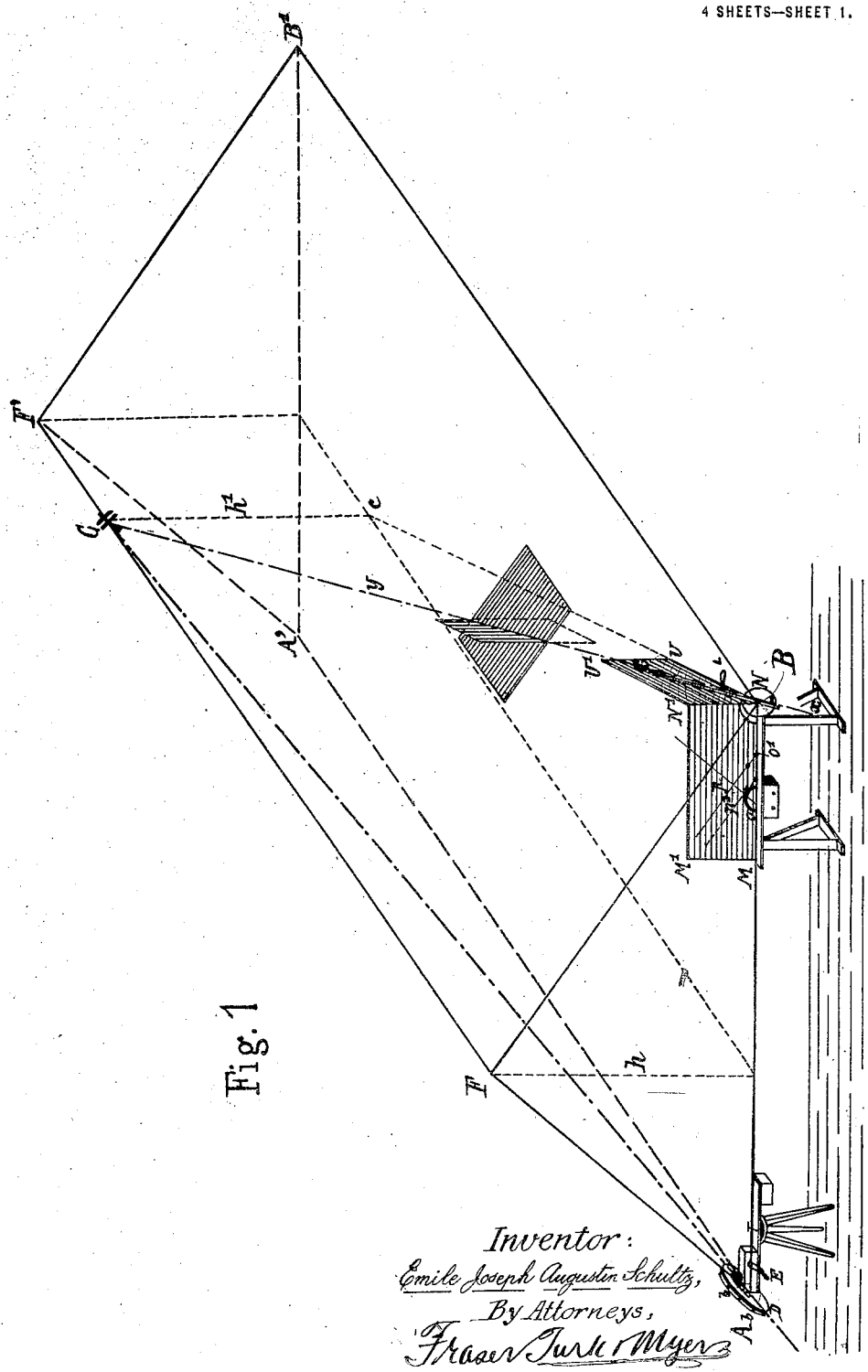

In Fig. 1, the two observing stations are represented at A and B. The device for locating and following the changes of position of, for example, an aeroplane is at C. The movable plate V¹ of the auxiliary station corresponds to one of the lateral faces of the prism. If we assume a second movable plate V at the principal station containing the sighting device it will correspond to the second lateral face of the prism which will intersect the first on the line F C, the geometric position of points at the height $h$.

If we consider, on the other hand, the plane determined by the point B and the vertical C H, this plane intersects the right section A B F of the prism on a vertical N (or B) N¹, and this plane can be turned relatively to this section by a hinge N N¹. This plane contains also the sighting device directed along B C; this sighting device is then at the intersection of the planes N N¹ H and V.

In practice, in order to obtain directly the distance B C, the telescope will be fixed in the plane N N¹ H¹ and the plane V will not exist. It will be sufficient by a suitable arrangement to reproduce the plane angle which it forms with the ground in diagram A¹ N N¹.

The apparatus at the stations A and B are represented in Figs. 2 and 3, 4, 5 and 6.

In this apparatus the angular velocity of the aeroplanes does not permit the use of astronomical telescopes. The sights are taken by means of an alidade with sight vanes. The alidade is also arranged so as to be able to follow an object at any time, even at night, when the sighted object is provided with a source of light or illuminated artificially from the ground.

For this purpose the mounting forming the objective of the alidade has a cylindrical form, the interior of which is rendered phosphorescent.

The sighting is effected when the atmosphere is dull by gradually withdrawing from the aperture of the eyepiece until one is no longer able to perceive the phosphorescent circle; at this moment the visual line coincides with the axis of the alidade.

The only object of the auxiliary station is to send to the receiving station the value of the corresponding two faces angle and its variations. It comprises a baseboard T (Fig. 2) of which the length is directed towards the receiving station and on which a disc D pivots at right angles to this direction. The horizontal plane passing through the middle height of the station coincides with the base of the prism defined above, and the axis $a$ on which the support Q of the disc D pivots is consequently the corner of the said two faces angle which it is required to measure.

The disc D which constitutes the sighting apparatus takes the places of a moving alidade. On its periphery are projections $b$ of the same length at the ends of which is fixed an endless thread which forms the perimeter of a polygon.

The sight, of which this arrangement provides an unlimited field of view, is taken by inclining the disc by means of a toothed segment C having an axle $a$ and rotated by toothed wheels $r^1$, $r^2$, $r^3$, by means of a hand crank $d$. This hand crank is turned until the aeroplane coincides with two diametrically opposite portions of the thread. When this is obtained it is easy by moving the hand crank $d$ either to right or to left to maintain the plane of the disc constantly in the direction of the aeroplane.

Figure 2:
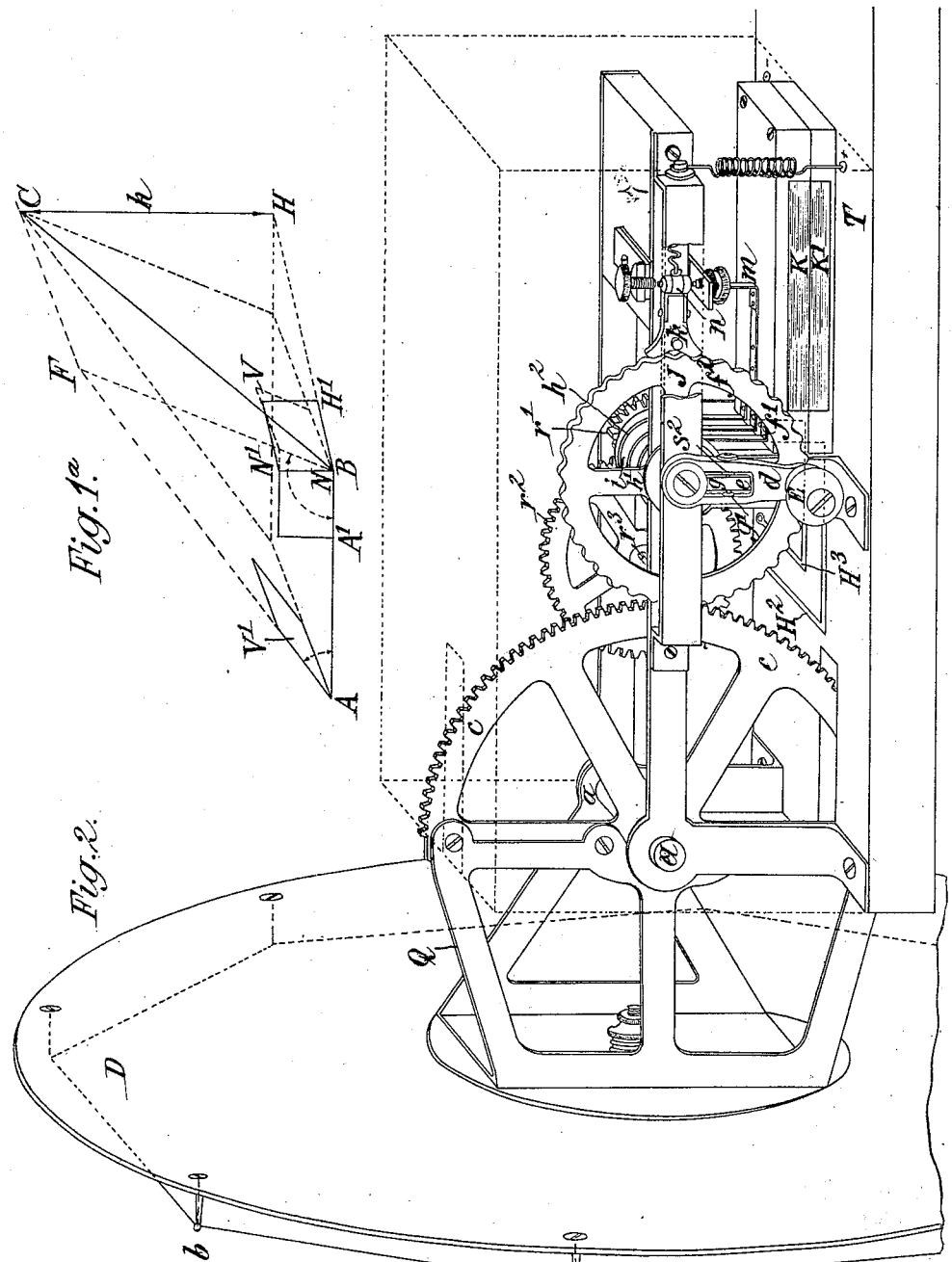
Figure 3:
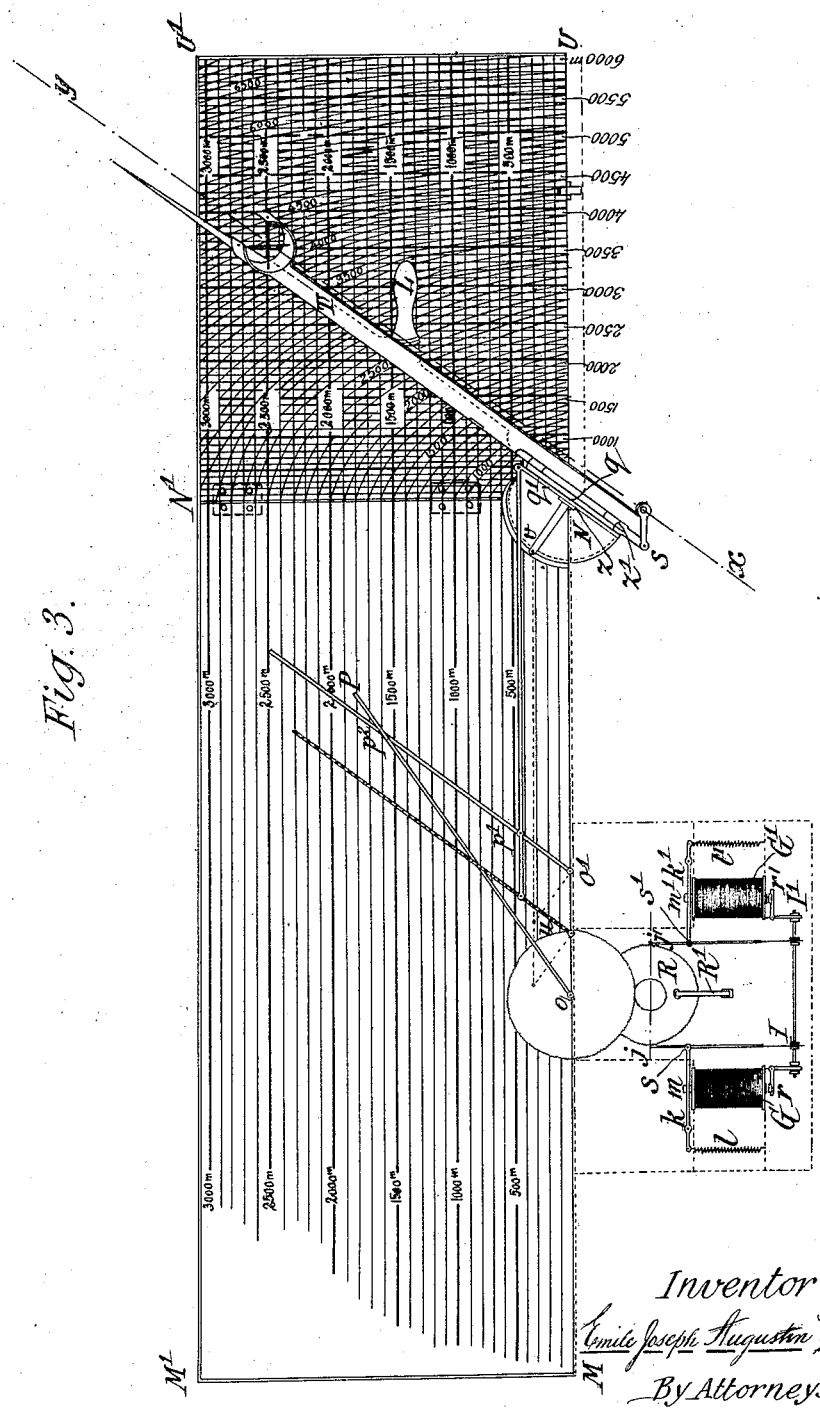
Figure 4:
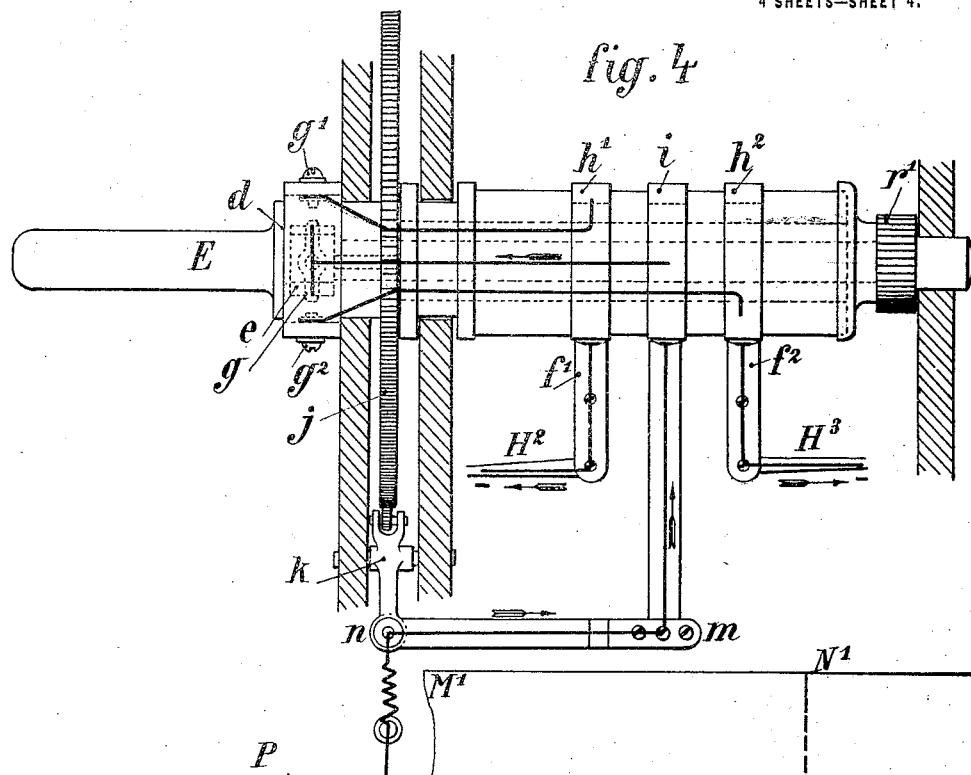
Fig. 4 is a plan view of the transmitting device shown in Fig. 2, together with a diagrammatic illustration of the electrical connections.
Figure 5:
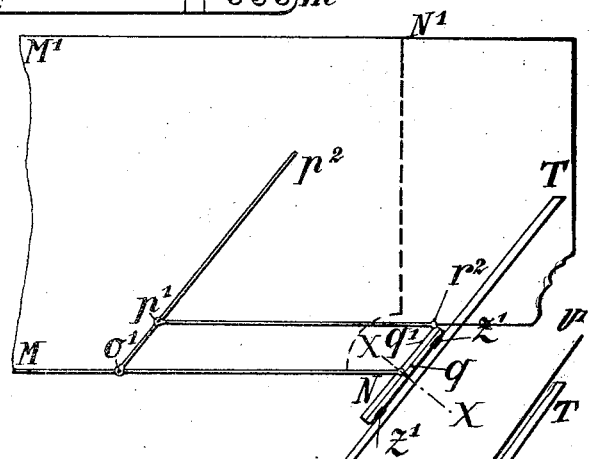
Figs. 5 and 6 show respectively, in elevation and in plan, the mechanism by which the movements of the alidades S T are transmitted to the pointer or indicator.
Figure 6:
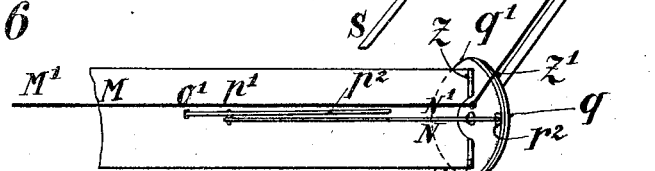

The movements of the disc are transmitted to the receiving station by means of the following electric device:

The hand crank $d$ Figs. 2 and 4 controlling the inclination of the disc D is made in two parts. One part $e$ fixed on the axle of the pinion $r^1$ carries a double contact $g$ which receives current from a battery or from accumulators; the other part of the hand crank is integral with the handle E and loose on the axle; it carries also two contacts $g^1$, $g^2$ the one or other of which touch the contact $g$ according to the direction in which the handle is rotated.

The two contacts $g^1$ and $g^2$ are connected to two different conductors H², H³ by metallic rings $h^1$, $h^2$ secured to an insulating cylinder and wipers $f^1$, $f^2$. Electric connection is established in this manner sometimes with one conductor, sometimes with the other according to the direction in which the hand crank E is manipulated.

As this action continues, the moving part of the hand crank actuates the member $g$ fixed on the shaft and a wheel with undulating perimeter J keyed on the shaft. The wheel J causes an interrupter $k$ to oscillate and imparts a vibratory movement to the transmitted current. Two condensers K and K¹ in connection, respectively, with the two leads and a double contact $n$ absorb the extra current at breaking and at the same time discharge the line after each contact in the same way as if it were put to earth.

This vibratory current sent to the receiving station by one or other of the conductors H², H³ traverses one of two electromagnets G, G¹ (Fig. 3,) according to the direction of rotation given to the handle E. These electromagnets have each two armatures. The upper armatures $m$, $m^1$ which are very light, in order to obtain a great rapidity of movement, and small retentivity, actuate a toothed wheel by means of pallets $j$, $j^1$ pivoted at the ends of levers $k$, $k^1$ maintained at a short distance from the cores of the electromagnets by springs $l$, $l^1$.

The lower armatures $r$, $r^1$ of greater magnetic permeability replace the yokes of the electromagnets and have more retentivity, since as they are only used in order to act on one or other of the pallets according to the required direction of rotation, they only operate at each inversion of movement. They act on the tails of the pallets $j$, $j^1$ to cause them to approach or be removed from the toothed wheel R by pivoting about the centres $s$, $s^1$. They are joined by a screwed rod I I¹ which serves to regulate all the levers of the apparatus by screw threads formed on it.

Finally, an adjustable spring R¹ brakes the wheel R so that the latter cannot be affected by undesired extraneous forces. The wheel R driven in this manner transmits its movement by a pinion to a wheel O carrying an index which is displaced on a chart M N M¹ N¹. The inclination of this index, therefore, shows the value of the angle determined at the auxiliary station.

The sighting at the receiving station is effected by the alidade S T on the line $x$, $y$ passing through the object glass and the eyepiece.

The alidade is manipulated by the handle L in the plane of the chart N U movable about the intersection N N¹. For this purpose it is connected by a hinge Z¹ to a disc $q$ which is keyed at its centre to a second disc $q^1$ pivoting on a diameter Z perpendicular to the plane of the chart M N M¹ N¹, (see Figs. 3, 5 and 6).

The inclination of the disc $q$ to the horizontal plane passing through M N shows the value of the plane angle of the two faces angle the corner of which is passing through the point N.

As explained above, the first phase of the operation consists in determining the height of the observed moving object. For this phase the chart is graduated horizontally to a convenient scale. The base N M of the chart being turned towards the auxiliary station, the pointer OP gives the plane angle of the two faces angle at the auxiliary station.

To determine that of the principal station the angle of the disk $q$ is transferred by the parallelogram N $o^1$ $p^1$ $r^2$ to the point $o^1$ of the chart of heights. By the sides of $o^1$ $p^1$, O $p$ and O $o^1$, a reduction of 1 to 10,000 of the right section of the prism is obtained. The intersection of the two pointers on the chart shows the height of the aeroplane. To obtain its distance, the second phase of the operation, it is sufficient to transfer the height $p^2$ on to the second chart as far as its intersection with the alidade, by means of the horizontal lines of the first chart; the point of intersection with one of the curves of equal distances traced, for example, from millimeter to millimeter on the chart gives in dekameters the distance of the aeroplane, while the abscissa of this point measures the horizontal distance.

As the alidade S T should always remain in a plane perpendicular to the chart N N¹ U U¹, a metallic arc serving as a guide may be arranged at a little distance from this chart. Also, a second parallelogram $o^1$ $u$ $v$ N behind the chart M N and of which the small sides form with those of the former angles of 90° facilitates the bearings of the pointer when they approach the horizontal.

Since the visibility of the aeroplanes does not exceed 6 km. the scale of 1 to 10,000 has been used for the chart that is, for a distance of 6 km. a chart having a length of 60 cm. and for height of 3 km. above the ground a chart of 30 cm. in height. In this proportion a base of 1 km. represented by the distance between the two stations determines an angle at the vertex sufficiently large to determine the height of this point with great precision.

At the receiving station where the right section of the prism is reproduced, a pointer of another colour having its centre at the middle of this base moves parallel to one of the end needles; the object of this third needle is to reduce the results by one half and thus to extend the range of the chart. The range of observation of the apparatus can then attain practically the highest degree of visibility.

Having thus described the nature of the said invention and the best means I know of carrying the same into practical effect, I claim:—

1. A process for determining the altitude and distance away of an object, comprising establishing two observation stations at a known distance apart, one of which is an auxiliary station and the other of which is a principal station, determining at each of said stations the angle which the horizontal plane makes with the planes passing through the stations and the object, perpendicularly to the vertical plane passing through the two stations, transmitting to the principal station the angle measured at the auxiliary station, and determining from said data the altitude, and distance from the principal station, of said object.

2. Means for determining the altitude and distance away of an object, comprising two observation stations a known distance apart, and sighting means at one station comprising a sighting disk pivoted on an axis perpendicular to a straight line joining said stations, and means for measuring the angle made by said disk with the horizontal plane.

3. Means for determining the altitude and distance away of an object comprising two observation stations a known distance apart, and sighting means at one station comprising a sighting disk pivoted on an axis perpendicular to a straight line joining said stations, and means for measuring the angle made by said disk with the horizontal plane, said disk having projections on its face, and a wire around the margin of said disk carried by said projections, by means of which the ease and accuracy of the sighting is facilitated.

4. Means for determining the altitude and distance away of an object, comprising two observation stations a known distance apart, means at each station including a sighting device for determining the angle which the horizontal plane makes with the planes passing through the stations and the object perpendicularly to the vertical plane passing through the two stations, an altitude chart, and indicators actuated by the sighting means for indicating in conjunction with said chart the aforesaid angles determined at said stations.

5. Means for determining the altitude and distance away of an object, comprising two observation stations a known distance apart, means at each station including a sighting device for determining the angle which the horizontal plane makes with the planes passing through the stations and the object perpendicularly to the vertical plane passing through the two stations, an altitude chart, and indicators actuated by the sighting means for indicating in conjunction with said chart the aforesaid angles determined at said stations, said chart being located at one observation station, and an electrical means between said stations for actuating one of said indicators.

6. Means according to claim 6, further characterized by including a vertically hinged distance chart and by one of the sighting devices comprising an alidade articulated around a fixed point on three axes, two of said axes being perpendicular, one to the other, and the third maintained in the plane of said distance chart, said distance chart remaining constantly in the vertical plane passing through said alidade.

7. Means according to claim 6 further characterized by including a vertically hinged distance chart, and by one of the sighting devices comprising two disks, an alidade hinged to one of said disks, said disk to which the alidade is hinged being pivotally connected at its center to said other disk, said last named disk being pivoted on an axis perpendicular to the distance chart.

8. Means according to claim 6 further characterized by one of said indicators being constituted by jointed arms in the form of a parallelogram.

9. Means according to claim 6 further characterized by said chart being provided with horizontal lines numbered to designate heights, said indicators being adapted to cross, and said chart showing by the horizontal line at the point of intersection of said indicators, the altitude of the object sighted.

10. Means according to claim 6 further characterized by said chart being provided with horizontal lines numbered to designate heights, said indicators in conjunction with said numbered lines showing the altitude of an object sighted said means further comprising a vertically hinged chart having curves thereon prolonged from said horizontal lines, one of said sighting devices being arranged to move alongside of said last named chart and to indicate, at its point of intersection with the curve prolonged from the horizontal line on the first named giving the ascertained altitude, the distance away of said sighted object.

11. Means for determining the altitude and distance away of an object, comprising two observation stations a known distance apart, means at each station including a sighting device for determining the angle which the horizontal plane makes with the planes passing through the stations and the object perpendicularly to the vertical plane passing through the two stations, one of said stations having an altitude chart and a distance chart hingedly connected together, and indicators actuated by the sighting means for indicating in conjunction with said charts the altitude and distance of the object from the said station.

In witness whereof, I have hereunto signed my name.

EMILE JOSEPH AUGUSTIN SCHULTZ.